US011513752B2

(12) United States Patent
Sako

(10) Patent No.: US 11,513,752 B2
(45) Date of Patent: Nov. 29, 2022

(54) PRINTING CONTROL APPARATUS THAT COMMUNICATES WITH CLOUD PRINT SERVICE, CONTROL METHOD, AND STORAGE MEDIUM

(71) Applicant: CANON KABUSHIKI KAISHA, Tokyo (JP)

(72) Inventor: Ritsuto Sako, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/371,896

(22) Filed: Jul. 9, 2021

(65) Prior Publication Data
US 2022/0019394 A1 Jan. 20, 2022

(30) Foreign Application Priority Data
Jul. 17, 2020 (JP) .............................. JP2020-123282

(51) Int. Cl.
*G06F 3/12* (2006.01)

(52) U.S. Cl.
CPC .......... *G06F 3/1287* (2013.01); *G06F 3/1203* (2013.01); *G06F 3/1231* (2013.01); *G06F 3/1288* (2013.01)

(58) Field of Classification Search
None
See application file for complete search history.

(56) References Cited

U.S. PATENT DOCUMENTS

| 10,171,310 B2* | 1/2019 | Hernandez .......... H04L 41/0816 |
| 10,997,211 B2* | 5/2021 | Merriman ............ G06F 16/278 |
| 2012/0215910 A1 | 8/2012 | Wada |
| 2013/0145027 A1* | 6/2013 | Parthasarathy ....... G06F 21/604 709/225 |
| 2017/0078149 A1 | 3/2017 | Utoh |
| 2020/0278815 A1* | 9/2020 | Li ...................... H04N 1/00244 |

FOREIGN PATENT DOCUMENTS

| JP | 2012133489 A | 7/2012 |
| JP | 2020047244 A | 3/2020 |
| WO | 2015047033 A1 | 4/2015 |

* cited by examiner

Primary Examiner — Paul F Payer
(74) Attorney, Agent, or Firm — Canon U.S.A., Inc. IP Division

(57) ABSTRACT

A printing control apparatus includes a transmission unit configured to transmit, to a transmission destination corresponding to any one of a plurality of different regions where a predetermined cloud print service is provided, a registration request to register the printing control apparatus in the predetermined cloud print service, and a setting unit configured to set the transmission destination.

36 Claims, 14 Drawing Sheets

FIG.4A

```
ABC CloudPrint Settings                               ~401
                                        [ Edit ]      ~405

402 — ABC CloudPrint Setting:        On
403 — Printer Name:                  MFP101
404 — Printer Registration Endpoint  https://login.abccloudprint.example.com ABC CloudPrint Registration Status
Click [Register] and regist the device.
                                        [ Register ] ~406
407 — Registration Status:    Not Registered
```

FIG.4B

```
ABC CloudPrint Settings                               ~411
                                        [ OK ]        ~415

412 — ABC CloudPrint Setting:        ☑On ☐Off
413 — Printer Name:                  [ MFP101 ]
414 — Printer Registration Endpoint: [ https://login.abccloudprint.example.de ]

ABC CloudPrint Registration Status
Click [Register] and regist the device.
                                        [ Register ]
Registration Status:    Not Registered
```

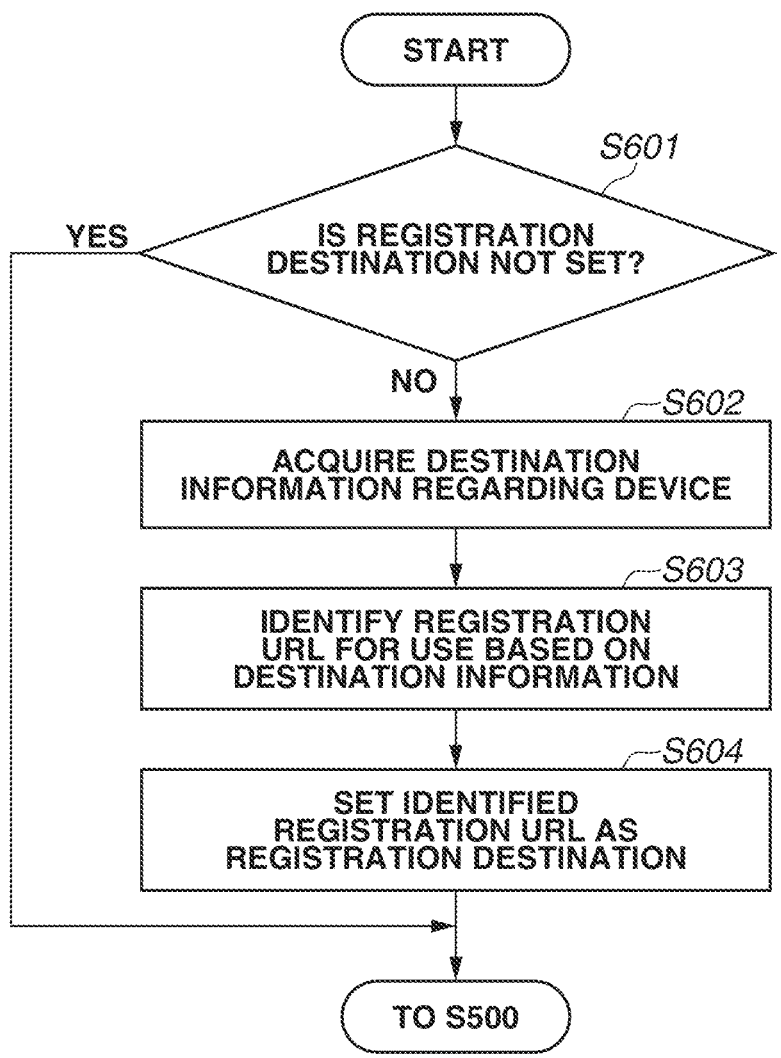

FIG.7A

| DESTINATION INFORMATION |
|---|
| US |
| DE |
| ⋮ |
| IT |
| CN |
| JP |
| KR |

FIG.7B

| DESTINATION INFORMATION | DESTINATION (ENDPOINT) FOR USE IN REGISTRATION IN CLOUD PRINT SERVICE |
|---|---|
| US | Https://login.abccloudprint.example.us |
| DE | Https://login.abccloudprint.example.de |
| CN | Https://login.abccloudprint.example.cn |
| Other | Https://login.abccloudprint.example.com |

FIG.8

| ABC CloudPrint Settings | |
|---|---|
| | Edit — 801 |
| ABC CloudPrint Setting: On | |
| Printer Name: MFP101 | |
| Printer Registration Endpoint  https://login.abccloudprint.example.de | Verify — 802 |
| | Verification OK! — 803 |

| ABC CloudPrint Registration Status | |
|---|---|
| Click [Register] and regist the device. | Register |
| Registration Status: Not Registered | |

FIG.10

ABC CloudPrint Settings

[Edit] ~1001

| | |
|---|---|
| ABC CloudPrint Setting: | On |
| Printer Name: | MFP101 |
| Printer Registration Endpoint | https://login.defcloudprint.example.ru [Verify] |

[Set Default Value] ~1002

ABC CloudPrint Registration Status

Click [Register] and regist the device.

Registration Status: Not Registered     [Register]

FIG.12

ABC CloudPrint Settings

OK — 1201

ABC CloudPrint Setting: ☑ On ☐ Off
1204 — Printer Name: [MFP101]
Printer Registration Endpoint: [https://login.abccloudprint.example.cn]

1202 — Select an Region (Endpoint) for Printer Registering Process:
- USA
- Germany
- China
- Global

1203

ABC CloudPrint Registration Status
Click [Register] and regist the device.
Registration Status:   Not Registered     [Register]

PRINTING CONTROL APPARATUS THAT COMMUNICATES WITH CLOUD PRINT SERVICE, CONTROL METHOD, AND STORAGE MEDIUM

BACKGROUND OF THE INVENTION

Field of the Invention

The present invention relates to a printing control apparatus that communicates with a cloud print service.

Description of the Related Art

In recent years, a cloud print mechanism for submitting a print job via a cloud and transmitting the print job to a printing apparatus begins to become prevalent (Japanese Patent Application Laid-Open No. 2012-133489). In such a printing system, an administrator registers a printing apparatus in a cloud print service (hereinafter also referred to as a "CPS") to which the administrator belongs. Thereafter, users permitted to use the CPS each select the printer registered in the CPS as an output printer using their client terminal, make a desired print setting, and transmit a print job to the CPS. The CPS having received the print job transfers the print job to the printing apparatus. The printing apparatus executes printing based on the transferred print job.

With a rise in security consciousness, stipulations and rules for handling information including personal information are increasing. For example, the Federal Office for Information Security in Germany provides an auditing standard for cloud security that should be applied to the government and organizations related to the government. This standard is termed Cloud Computing Compliance Controls Catalog (C5), and the standard defines minimum cloud security for introducing a public cloud solution. Private companies have also been increasingly introducing C5 and audit standards like C5.

SUMMARY OF THE INVENTION

One aspect of the present invention is directed to providing a mechanism for, in a case where a printing control apparatus is registered in a cloud print service, setting a registration destination region.

The printing control apparatus includes, as one aspect of the present invention to achieve at least one object described above, a transmission unit configured to transmit, to a transmission destination corresponding to any one of a plurality of different regions where a predetermined cloud print service is provided, a registration request to register the printing control apparatus in the predetermined cloud print service, and a setting unit configured to set the transmission destination.

Further features of the present invention will become apparent from the following description of exemplary embodiments with reference to the attached drawings.

BRIEF DESCRIPTION OF THE DRAWINGS

FIGS. 4A and 4B are examples of a screen displayed on an operation unit.

FIG. 6 is a flowchart illustrating an example of control according to a second exemplary embodiment.

FIGS. 7A and 7B are schematic diagrams illustrating a relationship between destination information and a region of a cloud print service (CPS).

FIG. 8 is an example of a screen displayed on an operation unit according to a third exemplary embodiment.

FIG. 10 is an example of a screen displayed on an operation unit according to a fourth exemplary embodiment.

FIG. 12 is an example of a screen displayed on an operation unit according to a fifth exemplary embodiment.

DESCRIPTION OF THE EMBODIMENTS

Exemplary embodiments for carrying out the present invention will now be described with reference to the drawings. The following exemplary embodiments do not limit the invention according to the appended claims, and not all the combinations of the features described in the exemplary embodiments are essential for a method for solving the issues in the present invention.

As described above, standards for information security that differ from country to country or area to area are increasingly formulated. Meanwhile, a cloud platform providing a service, such as a cloud print service (CPS), is achieved in general by a server resource in a data center installed in a particular region, and is provided to the entire world.

If, however, the region where the data center is installed stops due to a power outage or a network failure, the provision of the service to another region also stops. Furthermore, even though standards and rules for information security differ from country to country or area to area, the manner of handling information cannot be varied in each region where the cloud platform is provided. Specifically, the storage location of data, the sovereignty of the data, and compliance requirements cannot be varied in each area where a data center as a real resource in each region is installed. Thus, an appropriate cloud service cannot be provided to each region in the manner of handling data according to the standard for information security in each location of the data subject or each area where the service is consumed.

Particularly in the case of a cloud print service, the aggregation of print data including personal information outside the country may even be prohibited depending on the standard for information security formulated in each country or each area. In this case, the standard for information security formulated in each country or each area where a printing control apparatus is installed may not be able to be satisfied, if a resource in a data center installed in a particular region provides a common cloud print service.

In view of this, a description is given of a mechanism in which data centers in different regions provide a cloud print service in the present exemplary embodiments. The present exemplary embodiments provide a mechanism for setting a registration destination region in a case where a printing control apparatus is registered in a cloud print service. A specific mechanism will now described with reference to the drawings.

Figure 1:
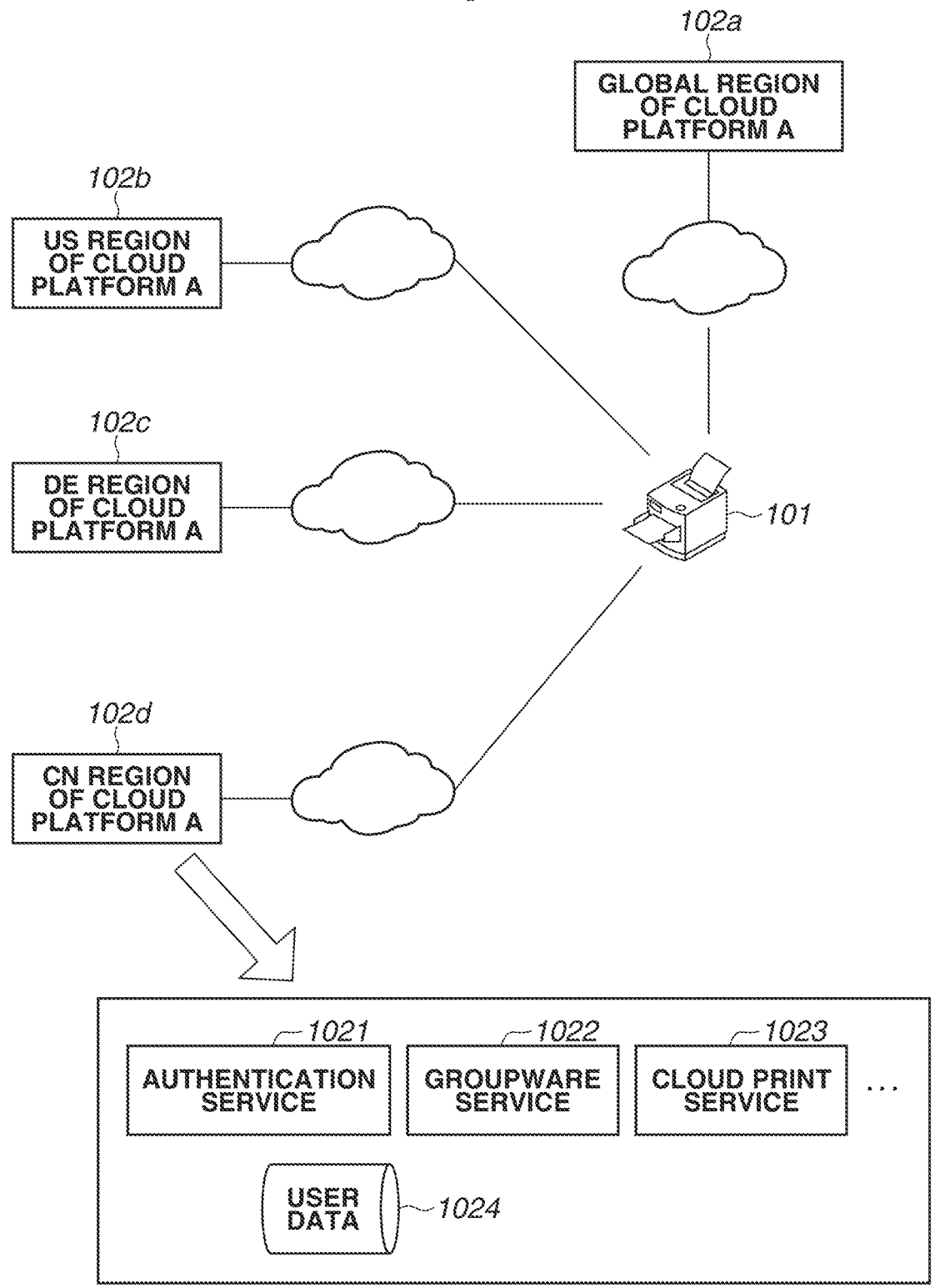
FIG. 1 illustrates an example of a printing system.

The configuration of a printing system according to the present invention will be described with reference to FIG. 1. A printing system according to a first exemplary embodiment includes a multifunction peripheral (MFP) 101 and a cloud platform A that provides a cloud print service and/or a groupware service. In the present exemplary embodiment, it is assumed that the CPS is provided as a service on a cloud platform, such as Amazon Web Services (AWS®), Azure®, or Google Cloud Platform®.

A vendor who provides the cloud platform A places data centers in a plurality of provision areas (also referred to as "regions") to appropriately provide services to the entire world, and develops cloud services using physically different instances in respective regions. A "region" may refer to an area on a country basis, or may be an area including a plurality of countries geographically grouped together, such as "South America", or may be an area including a plurality of countries politically grouped together, such as "European Union". Further, a single country can also be divided into a plurality of regions.

The present exemplary embodiment illustrates a case as an example where the cloud services on the cloud platform A are developed for a global region 102*a* where a special standard and a special rule for information security in each area are not provided. The present exemplary embodiment further illustrates a case where the cloud services on the platform A provided using physically different resources are separately developed for regions 102*b* to 102*d* so as to appropriately handle data based on a standard and a rule in each country. The DE region 102*c* is an instance provided to provide the cloud services within Germany. To be compliant with the Cloud Computing Compliance Controls Catalog (C5) auditing standard, this instance is achieved using a resource in a data center installed in Germany so that the data location comes in Germany. On a cloud platform provided for the DE region 102*c*, access to and control of data are strictly managed by a unique data trustee model compliant with C5. Instances for the CN region 102*d* and the US region 102*b* also operate in data centers different from that of the global region 102*a* so that appropriate access to and appropriate control of data can be performed in compliance with the law of each country and the security standard in each country.

That is, data and services on cloud platforms provided for the regions 102*b* to 102*d* are designed such that the storage location of the data, the sovereignty of the data, and compliance requirements certainly adhere to the standard and the rule in each region as a geographical boundary.

A provider who provides a cloud platform to a user may provide a cloud print service to the user. In a known cloud print service, however, regions are not considered. That is, a known cloud print service is achieved in general by a resource in a data center for a particular region (e.g., a global region) and provided to the entire world.

Depending on the standard for information security formulated in each country or each area, the aggregation of print data including personal information outside the country may even be prohibited. In this case, the standard for information security formulated in each country or each area where a printing control apparatus is installed may not be satisfied, if a resource in a data center installed in a particular region provides a common cloud print service.

In view of at least one of the above issues, the present exemplary embodiment provides a mechanism for varying a registration destination region when a printing control apparatus is registered in a cloud print service. This mechanism will now be specifically described.

The MFP 101 communicates with a client and a cloud print service on the Internet via a network. If a registration process is executed, the MFP 101 is registered as an output destination printer of the cloud print service provided for a particular region. After the registration, the MFP 101 can perform printing via the cloud print service.

The network may be configured by combining a communication network, such as a local area network (LAN) or a wide area network (WAN), a cellular network (e.g., Long-Term Evolution (LTE) or fifth generation (5G)), and a wireless network compliant with the Institute of Electrical and Electronics Engineers (IEEE) 802.11. That is, the network only needs to be configured to enable the transmission and reception of data, and may employ any method as a method for communication between physical layers.

The MFP 101 has a scan function for transmitting data based on an image obtained by reading a document using a scanner to outside, a print function for printing an image on a sheet such as paper based on a print job received from an external apparatus, and a copy function. The MFP 101 can also receive a print job via the CPS registered in advance and perform printing. In the present exemplary embodiment, an MFP having a plurality of functions is illustrated as an example of a printing control apparatus. The present invention, however, is not limited to this. For example, a single-function printing control apparatus having only a print function may be used. The printing control apparatus may be a print server that transfers received print data to a printing apparatus under control of the print server.

The cloud services provided to a customer by the cloud platform A will now be described. The cloud platform A is a service platform that provides a cloud print service 1023, a groupware service 1022, a web email service, and a service for creating and editing a document to an organization such as a company. The cloud platform A also includes an authentication service 1021 for authenticating and managing a user or a device that uses the various services.

The authentication service 1021 authenticates and manages a user or a user group with respect to each tenant. The cloud platform A manages authority to use the cloud services and manages access to customer data with respect to each tenant. A "tenant" is the use unit of a cloud platform. Specifically, a different tenant is assigned to each organization (e.g., each company or each organization) having a contract to use a cloud service platform. A virtual printer object of a cloud print service is also managed with respect to each tenant. That is, user data 1024 including print data, data required to achieve the CPS, and a user database (DB) for user authentication is managed with respect to each tenant.

The virtual printer object is a software module that provides the function of temporarily spooling a print job received from outside, and the function of transferring the spooled print job to a printing control apparatus, such as an MFP at a subsequent stage.

The CPS receives a print job from a client terminal (not illustrated) and transmits the print job to a corresponding virtual printer object. The virtual printer object stores the print job in a spool area managed by the virtual printer object itself. The virtual printer object then notifies an MFP registered in the CPS that a print job is submitted. The MFP having received the notification acquires the print job from the spool area of the virtual printer object and executes printing based on the acquired print job.

Configuration of MFP

Figure 2:
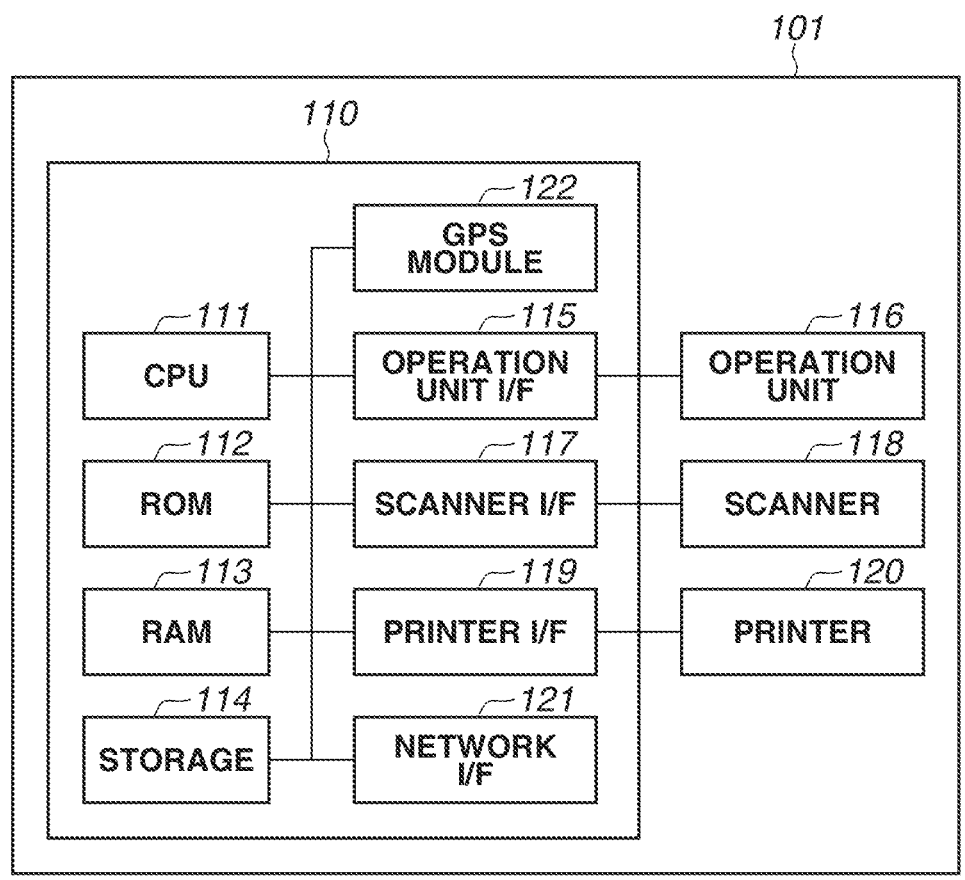
FIG. 2 is an example of a hardware configuration of a multifunction peripheral (MFP).

A description will be given of the hardware configuration of the MFP 101, which is an example of the printing control apparatus according to the present exemplary embodiment, with reference to FIG. 2. FIG. 2 is a block diagram illustrating the hardware configuration of the MFP 101.

A control unit 110 including a central processing unit (CPU) 111 controls the operation of the entirety of the MFP 101. The CPU 111 reads a control program stored in a read-only memory (ROM) 112 or storage 114 and performs various types of control, such as printing control and reading control. The ROM 112 stores a control program that can be executed by the CPU 111. A random-access memory (RAM) 113 is a main storage memory accessed by the CPU 111, and is used as a work area or a temporary storage area into which various types of control programs are loaded. The storage 114 stores a print job, image data, various programs, and various pieces of setting information. Pieces of hardware such as the CPU 111, the ROM 112, the RAM 113, and the storage 114 thus compose a so-called computer.

In the MFP 101 according to the present exemplary embodiment, a single CPU 111 executes processes illustrated in flowcharts described below, using a single memory (the RAM 113). Alternatively, another form may be used. For example, a plurality of processors, memories, and spaces of storage can also cooperate to execute the processes illustrated in the flowcharts described below. Alternatively, some of the processes may be executed using a hardware circuit.

A printer interface (I/F) 119 connects a printer 120 (a printer engine) and the control unit 110. The MFP 101 generates a printing image and a printing control command to be transferred to the printer 120 based on a print job. The printer 120 prints an image on a sheet fed from a sheet feeding cassette (not illustrated) based on the printing image and the printing control command input to the printer 120 via the printer I/F 119. The printing method may be an electrophotographic method for transferring toner to paper and fixing the toner, or may be an inkjet method for performing printing by discharging ink to paper.

A scanner I/F 117 connects a scanner 118 and the control unit 110. The scanner 118 reads a document placed on a document platen (not illustrated) and generates image data. The image data generated by the scanner 118 is printed by the printer 120, stored in the storage 114, or transmitted to an external apparatus via a network I/F 121.

An operation unit I/F 115 connects an operation unit 116 and the control unit 110. The operation unit 116 includes a liquid crystal display unit having a touch panel function, and various hardware keys. The operation unit 116 functions as a display unit that displays information to a user, and a reception unit that receives an instruction from the user. The CPU 111 cooperates with the operation unit 116 to control the display of information and control the reception of a user operation.

A network cable is connected to the network I/F 121, and the MFP 101 can communicate with an external apparatus on a network or the Internet. In the present exemplary embodiment, a case is assumed where the network I/F 121 is a communication interface that performs wired communication compliant with Ethernet®. The present invention, however, is not limited to this. For example, the network I/F 121 may be a wireless communication interface compliant with the IEEE 802.11 series. Yet alternatively, the network I/F 121 may be a communication interface that performs mobile communication using a third generation (3G) circuit based on code-division multiple access (CDMA), a fourth generation (4G) circuit based on LTE, or 5G New Radio (NR).

A Global Positioning System (GPS) module 122 is a module including an antenna for the GPS, and a calculator that measures a position. The GPS module 122 receives a signal from a GPS satellite and performs calculations for measuring a position and calculating time information. The control unit 110 is notified of the calculation results.

Figure 3:
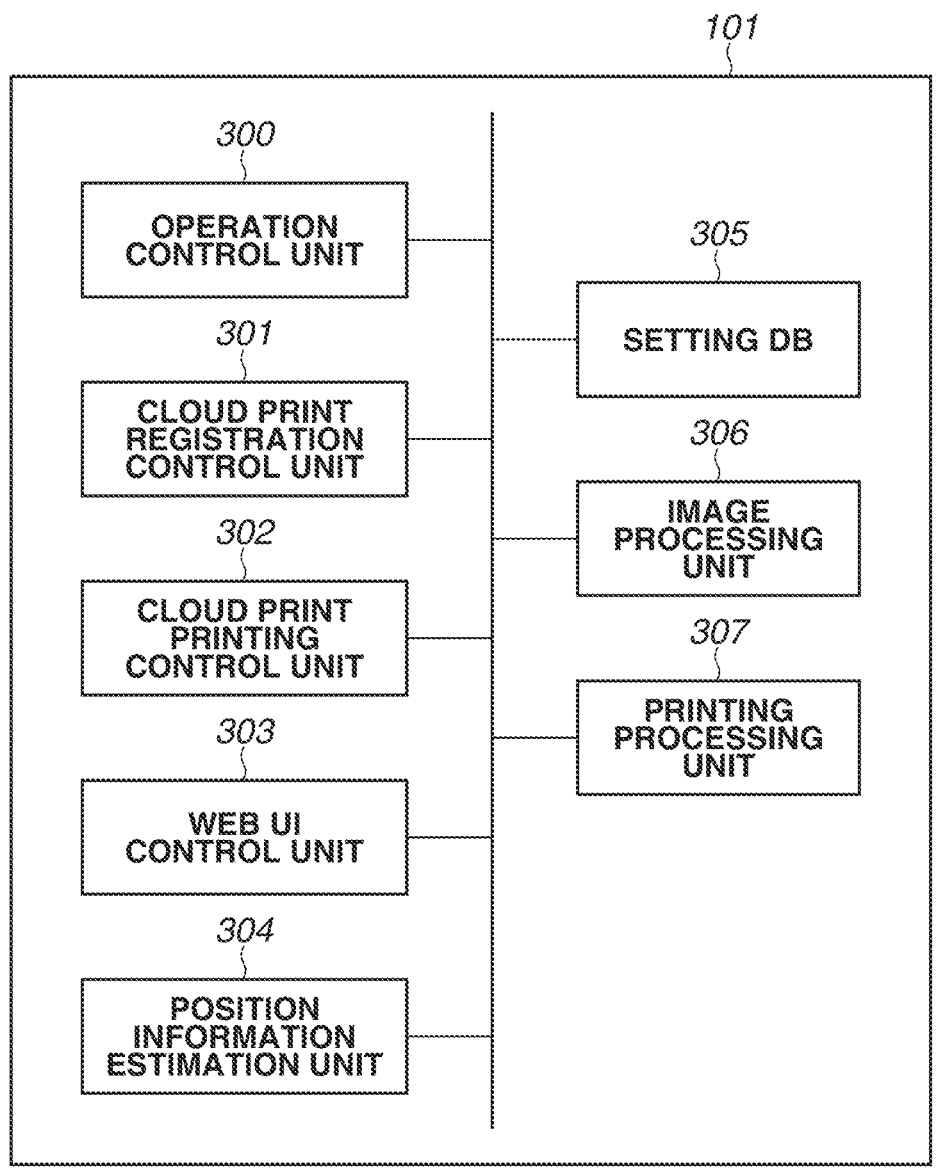
FIG. 3 is an example of a software configuration of a multifunction peripheral (MFP).

FIG. 3 is a diagram illustrating the software configuration of the MFP 101. Function units illustrated in FIG. 3 are achieved by the CPU 111 of the MFP 101 executing a control program loaded into the RAM 113.

An operation control unit 300 generates screen information regarding a setting screen, and provides the function of displaying an operation screen on the operation unit 116 based on the screen information. The operation control unit 300 also detects a user operation performed through the touch panel and the hardware keys included in the operation unit 116, notifies another function unit of the received operation, and updates the display of the screen based on the operation.

A cloud print registration control unit 301 controls the process of registering the MFP 101 in the CPS. If the MFP 101 is registered in the CPS in any of the regions by this registration process, printing can be performed via the CPS in the region. If the registration process is successful, an access token for accessing a resource in a user tenant on the cloud platform A and Uniform Resource Locator (URL) information used to communicate with the CPS are stored in a setting DB 305.

The setting DB 305 stores information indicating the setting of a registration destination in which a destination region is specified, and a destination URL with respect to each region. The setting DB 305 also stores device identification (ID) used in the registration process. The information stored in the setting DB 305 is appropriately referred to or changed in the flowcharts described below.

A cloud print printing control unit 302 provides the function of receiving a print job from the cloud print service using the access token and the URL information stored in the setting DB 305. The printing control unit 302 having received from the CPS a notification that a print job is submitted receives the print job from the CPS. The control unit 302 then transfers page description language (PDL) data and a rendering instruction included in the print job to an image processing unit 306. The image processing unit 306 having received the PDL data and the rendering instruction generates image data for printing based on the instruction. The generated print data is transferred to a printing processing unit 307. The printing processing unit 307 transmits the printing image data rendered by the image processing unit 306 and a control command to control the printer 120 to the printer 120 via the printing unit I/F 119 and causes the printer 120 to execute a printing process.

A web user interface (UI) control unit 303 functions as a Hypertext Transfer Protocol (HTTP) server. The control unit 303 provides a web page for setting the MFP 101 to a web browser on the client terminal. A user, such as an administrator, inputs the Internet Protocol (IP) address and the host name of the MFP 101 to the web browser and thereby can access the web page provided by the control unit 303.

A position information estimation unit 304 cooperates with the GPS module 122 to estimate longitude/latitude information. The position information estimation unit 304 also provides the function of estimating the country where the MFP 101 is installed using the longitude/latitude information. The estimation result is used to identify a region.

Method for Changing Region

A description will now be given of a specific method for switching the region where the cloud print service is used when the cloud print service is registered, with reference to FIGS. 4A, 4B, and 5. FIGS. 4A and 4B illustrate examples of a web UI provided to the web browser on the client terminal by the web UI control unit 303, and examples of a setting change screen regarding a cloud print function. The present exemplary embodiment illustrates a case where a web page is supplied to the web browser on the client terminal, and an instruction to change a setting is received through the web browser. The present invention, however, is not limited to this. A configuration can also be employed in which the operation control unit 300 displays a setting screen equivalent to a screen 401 on the operation unit 116, and a setting is changed through the operation unit 116 included in the MFP 101.

The screen 401 is an example of a screen for making settings and registration regarding a predetermined cloud print function included in the MFP 101. Hereinafter, the predetermined cloud print function will also be referred to as a "first cloud print function" or a "first type of cloud print function". The screen 401 is provided to a user having administrator authority of the MFP 101.

An item 402 is a display item indicating whether the first type of cloud print function is enabled or disabled. In the screen 401, a case is illustrated as an example where the first type of cloud print function is enabled. An item 403 indicates a printer name used to identify a printer on the cloud print service. An item 404 indicates a registration destination used when the cloud print is registered. A case is illustrated here as an example where a URL corresponding to the global region 102a, which is the default value of the registration destination, is set. An item 407 indicates the registration status of the first type of cloud print function. The screen 401 illustrates, as an example, the state where the first type of cloud print function is not registered. A display item 406 is a key used to register the first type of cloud print function included in the MFP 101 in the cloud print service.

A display item 405 is a key used to change the settings of the cloud print function. The web browser on the client terminal having detected the selection of the display item 405 transmits information corresponding to a selection event of the display item 405 to the MFP 101. The MFP 101 having received the information performs control to switch the screen displayed on the web browser to a screen 411 illustrated in FIG. 4B. The user can switch the enabled/disabled state of the first type of cloud print function through a checkbox corresponding to an item 412 on the screen 411. The user can also change the printer name through a text box corresponding to an item 413.

The user can also change the registration destination (an endpoint), which is used as the transmission destination of a printer registration request to the CPS, through a text box corresponding to an item 413. In view of the country or the area where the MFP 101 is installed, the user, such as the administrator, can input a URL indicating a destination corresponding to any of the regions 102a to 102d and another region. As the other region, for example, a private cloud region separately provided for a government organization is assumed. The endpoint is an endpoint for newly registering an application or a device, such as a printing control apparatus, in the cloud platform A.

A display item 415 is a key used to apply the changes in the settings. If detecting that the display item 415 is selected, the client terminal transmits, to the MFP 101, information indicating the settings made through the screen 411. The web UI control unit 303 of the MFP 101 having received the information stores setting values based on the information in the setting DB 305.

Based on this process, it is possible to change a region as the transmission destination of a registration request by an operation of the user, such as the administrator.

Control of the MFP 101 according to the first exemplary embodiment will be described with reference to a flowchart illustrated in FIG. 5. Operations (steps) illustrated in the flowchart in FIG. 5 are achieved by the CPU 111 executing a control program stored in the ROM 112 or the storage 114. In a case where it should be clarified what performs the processing, the description will be given such that the software module executed by the CPU 111 is the subject. Similarly, flowcharts illustrated in FIGS. 6, 9, 11, 13, and 14 are also achieved by the CPU 111 executing a control program stored in the ROM 112 or the storage 114.

The CPU 111 cooperates with the network I/F 121 to achieve control of the transmission and reception of data. The CPU 111 cooperates with a processor and a display unit on the client terminal (not illustrated) to achieve control of the display of a setting screen and the reception of a user operation.

Figure 5:
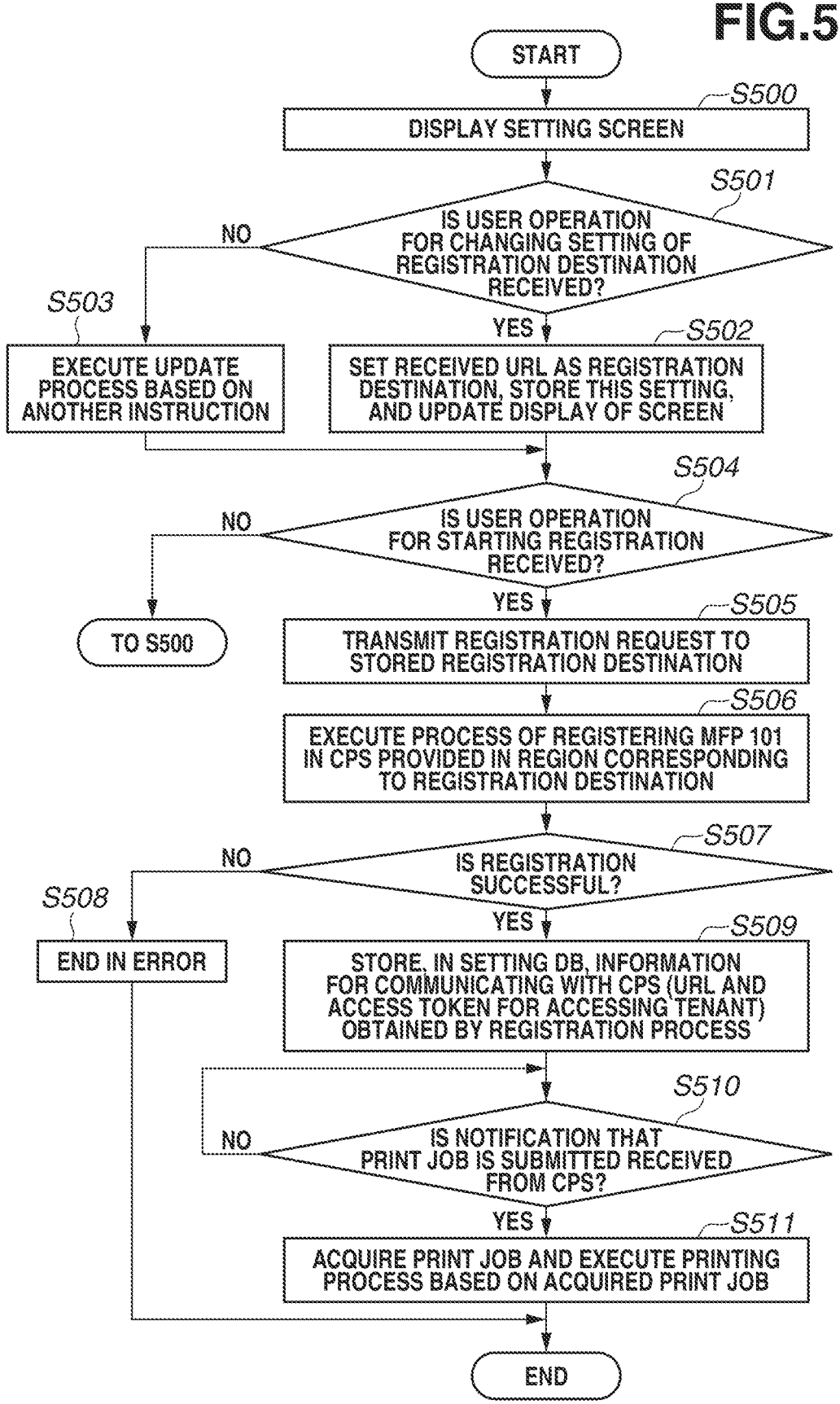
FIG. 5 is a flowchart illustrating an example of control according to a first exemplary embodiment.

In FIG. 5, control regarding the registration and the use of the cloud print service is selectively described. The control includes a change in the registration destination as the transmission destination of a registration request, a registration process, and a printing process after the registration.

In step S500, the CPU 111 provides web data corresponding to a setting screen to the client terminal according to a request from the client terminal, and displays the setting screen on the web browser on the client terminal. The user who owns the client terminal performs an operation for changing a setting through the setting screen.

In step S501, the CPU 111 determines whether information indicating a change in the setting of the registration destination is received from the web browser on the client terminal. If the information indicating a change in the setting of the registration destination is included in information received from the web browser (YES in step S501), the processing proceeds to step S502. If the information indicating a change in the setting of the registration destination is not included (NO in step S501), the processing proceeds to step S503.

In step S502, the web UI control unit 303 saves in the setting DB 305 the registration destination based on character string information indicating the registration destination received from the web browser. For example, if a user operation for selecting the display item 415 is received in the reception state illustrated as an example in the screen 411, the registration destination is changed to "https://login.abc-cloudprint.example.de". Based on this process, the registration destination as the transmission destination of a registration request can be changed to the DE region 102c. The web UI control unit 303 then generates web data corresponding to the setting screen, thereby updating the setting screen. If the update is completed, the processing proceeds to step S504.

In step S503, the CPU 111 performs another change process (e.g., the process of changing the printer name or the process of changing the setting of whether the first type of cloud print function is enabled or disabled) where necessary, and the processing proceeds to step S504.

In step S504, the CPU 111 determines whether a user operation for starting registration is received. If information that occurs triggered by the selection of the display item 406 and corresponds to the selection of the display item 406 is received from the web browser on the client terminal, the control unit 303 determines that the user operation for starting registration is received (YES in step S504), and the processing proceeds to step S505. If the information is not received, the control unit 303 determines that the user operation for starting registration is not received (NO in step S504), and the processing returns to step S500. In step S500, the control unit 303 waits for the operation for changing the setting of the first type of cloud print function or the operation for starting registration.

In step S505, the registration control unit 301 refers to the setting DB 305 and acquires the registration destination. The registration control unit 301 then transmits to the registration destination a registration request including a device ID capable of identifying the MFP 101. In step S506, the registration control unit 301 cooperates with the web browser on the client terminal (not illustrated) and a cloud platform provided in a region corresponding to the registration destination to execute the process of registering the MFP 101 in the cloud print service. Specifically, a response to the registration request includes a temporary URL for the registration, and a user code that functions as a one-time password for the registration. The user, such as the administrator, inputs the URL to the web browser and accesses a web page provided by the cloud print service. The user, such as the administrator, inputs an administrator account of a tenant to which the user belongs (a tenant in which the user wants to use the MFP 101 as a cloud printer) and the user code via the web page. The CPS allows the user to log into the CPS based on the administrator account. The CPS also identifies an MFP as a registration target (e.g., the MFP 101) based on the user code, and generates a virtual printer object for transmitting a print job to the MFP. Based on this process, a cloud printer corresponding to the MFP 101 is registered in the tenant of the CPS. Through this registration sequence, the MFP 101 obtains information for communicating with the CPS, such as an access token for accessing the user tenant and URL information for receiving a notification indicating an event or the submission of a job from the CPS.

The description returns to FIG. 5. In step S507, the registration control unit 301 determines whether the process of registering the MFP 101 in the CPS in the region corresponding to the registration destination is successful. If the registration process is successful (YES in step S507), the processing proceeds to step S509. If the registration process is failed (NO in step S507), the processing proceeds to step S508.

In step S508, the registration control unit 301 notifies the web browser on the client terminal of an error, and the series of processes ends. In step S509 in contrast, the registration control unit 301 stores in the setting DB 305 the information for communicating with the CPS obtained in the registration process. From this point onward, the printing control unit 302 can access information regarding the user tenant on the CPS using the information for communicating with the CPS stored in the setting DB 305. That is, the printing control unit 302 can confirm or acquire a print job submitted to the CPS in the region where the registration is made in the registration process.

In step S510, the printing control unit 302 determines whether a notification that a print job is submitted is received from the CPS. If the notification that a print job is submitted is received (YES in step S510), the processing proceeds to step S511. If the notification that a print job is submitted is not received (NO in step S510), the printing control unit 302 waits for the submission of a print job.

In step S511, the printing control unit 302 acquires the print job. The control unit 302 then cooperates with the image processing unit 306 and the printing processing unit 307 to print a printing image based on the acquired print job on a sheet. The sheet on which the printing image is printed is discharged to a sheet discharge tray (not illustrated). When the printing is completed, the series of processes of control ends.

Based on the above series of processes of control, it is possible to vary a registration destination region in a case where the MFP 101 is registered in a cloud print service.

In a second exemplary embodiment, a description will be given of a method for varying the default value of the registration destination based on destination information stored in the MFP 101 before shipment from the factory, in addition to the processing described in the first exemplary embodiment. In the first exemplary embodiment, a case has been illustrated, as an example, where the URL of the global region 102a is set as the default value of the registration destination. In the second exemplary embodiment, a description is given of a mechanism in which the initial value (the default value) of the registration destination is not set, and the setting value of the registration destination is changed based on the destination information in a case where the MFP 101 is initially started or a user operation for displaying the screen 411 is received.

The hardware configuration and the software module configuration of the second exemplary embodiment are similar to those of the first exemplary embodiment, and therefore are not described.

Specific control will now described with reference to FIGS. 6, 7A, and 7B. FIG. 6 is a flowchart illustrating an example of control of the MFP 101 according to the second exemplary embodiment. FIGS. 7A and 7B are schematic diagrams illustrating the relationship between destination information and the region of the CPS.

Destination information will be described with reference to FIG. 7A. Destination information is registered in the MFP 101 in advance at the timing of shipment from the factory or at a previous stage where a purchase or lease contract is finalized and the MFP 101 is delivered to a customer. The destination information is provided to specify a consuming area (a sales area) or a shipment area. The destination information is also provided to perform a function customization process in each shipment area according to the trend and the culture of each country.

FIG. 7A illustrates examples of candidates for the destination information stored in the MFP 101. FIG. 7A selectively illustrates some pieces of destination information. In the setting DB 305 of the MFP 101, any one of the pieces of destination information regarding US, DE, IT, CN, JP, and KR is set.

FIG. 7B is a diagram illustrating the correspondence relationship between the destination information and the destination for use in the registration process for registering the MFP 101 in the cloud print service. The correspondence relationship is stored in the setting DB 305. With reference to the flowchart illustrated in FIG. 6, a description will be given of a method for changing the setting value of the registration destination using the information in FIG. 7B and the destination information stored in advance in the MFP 101. The flowchart in FIG. 6 is executed at the timing when a user operation for displaying the screen 411 is received.

In step S601, the web UI control unit 303 refers to the setting DB 305 and determines whether the setting value indicating the registration destination is not set (is in a null state or a blank state). If it is determined that the setting value is not set (NO in step S601), the processing proceeds to step S602. If it is determined that the setting value is set (YES in step S601), the processing proceeds to step S500 in the first exemplary embodiment.

In step S602, the web UI control unit 303 refers to the setting DB 305 and acquires the destination information. In step S603, the web UI control unit 303 identifies a destination URL for use in a registration request to the cloud platform based on the destination information.

A specific process will be described with reference to FIG. 7B. Using the destination information as a search key, the web UI control unit 303 performs a search by determining whether a destination URL corresponding to the destination information is registered in the setting DB 305. If a destination URL corresponding to the destination information is registered as a result of the search, the destination URL is selected. If the destination information indicates, for example, "DE", a destination URL corresponding to the DE region 102c is selected. If the destination information indicates "US", a destination URL corresponding to the US region 102b is selected. If the destination information indicates "CN", a destination URL corresponding to the CN region 102d is selected. If a destination URL corresponding to the destination information is not present, in contrast, a destination URL corresponding to "Other" is selected. Based on the determination process illustrated in step S602, a destination URL can be determined.

In step S604, the control unit 303 sets the destination URL identified in the process of step S603 as the registration destination, thereby updating the setting DB 305. After the update process is completed, the processing proceeds to step S500.

In the second exemplary embodiment, a case has been illustrated as an example where the change process described in FIG. 6 is executed at the timing when an instruction to display the screen 401 is received. The timing of the change, however, is not limited to this. For example, the processing illustrated in FIG. 6 can also be executed at the timing when the MFP 101 starts for the first time after shipment from the factory (e.g., the timing when the MFP 101 arrives at the installation location of the customer and is powered on). In the present exemplary embodiment, a case has been illustrated as an example where the information regarding the destination is on a country basis. The present invention, however, is not limited to this. For example, a configuration may be employed in which a destination URL is identified based on destination information in broad classifications, such as Europe, Asia, Oceania, China, and North America. In this case, if the destination information indicates "Europe", the destination URL corresponding to the DE region 102c is selected. If the destination information indicates "North America", the destination URL corresponding to the US region 102b is selected. If the destination information indicates "China", the destination URL corresponding to the CN region 102d is selected. If the destination information indicates another classification, the destination URL corresponding to the global region 102a is selected.

A third exemplary embodiment provides a mechanism for, in addition to the control described in each of the first and second exemplary embodiments, performing a connection test, thereby verifying whether the endpoint of a registration request can be appropriately accessed using the registration destination after a change. The hardware configuration and the software module configuration of the third exemplary embodiment are similar to those of the first exemplary embodiment, and therefore are not described.

A screen 801 illustrated in FIG. 8 is an example of a screen provided by the web UI control unit 303, and the screen 801 illustrates an example of a screen displayed instead of the screen 401 in the first exemplary embodiment. Components similar to those of the screen 401 are not described. The screen 801 is different from the screen 401 in that a display item 802 and a notification area 803 are present. The display item 802 is a key used to perform a communication test with the currently set registration destination. The notification area 803 is an area where a notification indicating the result of the connection test is displayed.

Figure 9:
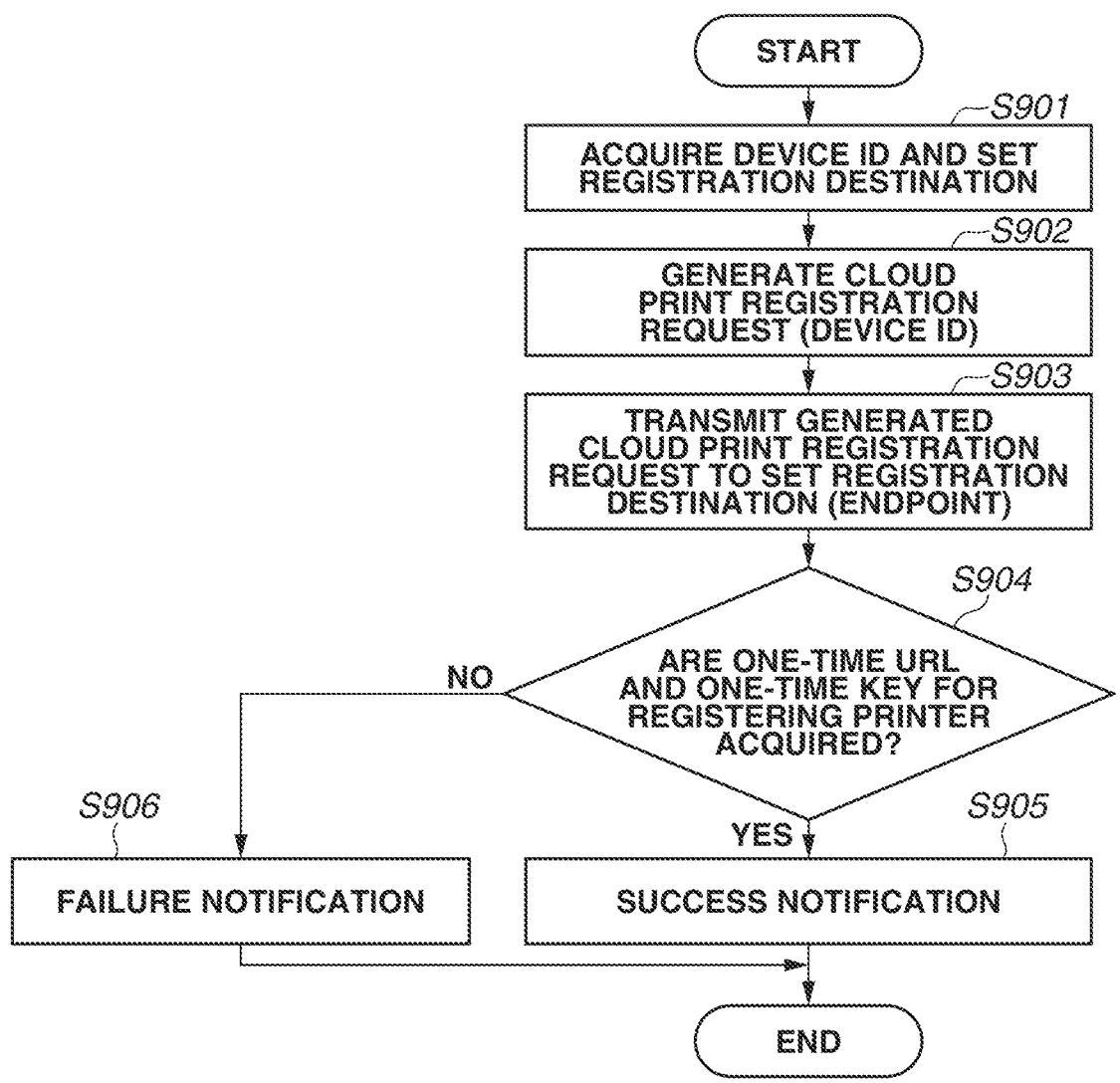
FIG. 9 is a flowchart illustrating an example of control according to the third exemplary embodiment.

The connection test will be described with reference to a flowchart illustrated in FIG. 9. Processes illustrated in the flowchart in FIG. 9 are executed in a case where the MFP 101 receives information that occurs due to the selection of the display item 802 on the web browser.

In step S901, the web UI control unit 303 requests the registration control unit 301 to attempt a registration process. The registration control unit 301 acquires the device ID and the set registration destination from the setting DB 305. In step S902, the registration control unit 301 generates data of a registration request including the device ID acquired in step S901. In step S903, the registration control unit 301 transmits the generated data of the registration request to the registration destination acquired in step S901.

In step S904, the web UI control unit 303 cooperates with the registration control unit 301 to determine whether a success response (a response including a one-time URL and a one-time key for the registration) is acquired. This process will be specifically described. The registration control unit 301 notifies the web UI control unit 303 of a result in response to the registration request that the web UI control unit 303 requests the registration control unit 301 to make. If a certain response is received, the web UI control unit 303 is notified of the response (a success response including a one-time URL and a user code as a one-time key for performing the registration process, or a failure response). If the destination is not reached, the web UI control unit 303 is notified of a failure response. If the web UI control unit 303 having received the notification acquires the one-time URL and the user code as the one-time key for registering the printer (YES in step S904), the processing proceeds to step S905. If the web UI control unit 303 does not acquire the one-time URL and the user code as the one-time key (NO in step S904), the processing proceeds to step S906.

In step S905, the web UI control unit 303 instructs the client terminal to display a success notification. The client terminal having received the instruction updates the screen using a script, such as JavaScript®, supplied as web data from a server. The script is executed by a script engine provided by the web browser. The script operates a Document Object Model (DOM) interface corresponding to the screen, and updates the notification displayed in the notification area 803 to a notification indicating that the verification is successful.

In step S906, the web UI control unit 303 cooperates with the client terminal to display a failure notification in the notification area 803 of the screen 801. Specific control of the display is similar to that performed in step S905, and therefore is not described. After the notification is completed, the series of processes of the connection test ends.

Based on the above processing, using a registration URL after a change makes it possible to appropriately verify whether processing can proceed to a step after a registration process.

In the present exemplary embodiment, a case has been illustrated as an example where the connection test is performed according to the selection of the display item 802 for performing verification. The timing when the connection test is performed, however, is not limited to this. For example, the connection test may alternatively be performed at the timing when the display item 415 described in FIG. 4 is selected. In this case, control may be performed such that the overwriting of the registration destination is permitted in a case where the connection test is successful in the processes in FIG. 9, and that the overwriting of the registration destination is prohibited in a case where the connection test is failed. Yet alternatively, the connection test may be performed at the timing when an input operation on the item 414 is completed and the character string of a candidate to be set as the registration destination is finalized.

In a fourth exemplary embodiment, a description will be given of a mechanism for providing the function of initializing the setting value of the registration destination in addition to the processing according to the first to third exemplary embodiments, with reference to FIGS. 10 and 11.

A screen 1001 illustrated in FIG. 10 is an example of a screen displayed instead of the screen 801. Components similar to those of the screen 801 are not described. The screen 1001 is different from the screen 801 in that a display item 1002 is present. The display item 1002 is a key used to initialize the registration destination.

The process of initializing the registration destination will now described with reference to flowcharts illustrated in FIGS. 11A and 11B. Processes illustrated in the flowchart in FIG. 11A or 11B are executed in a case where the MFP 101 receives a request to acquire the editing screen 411.

Figure 11A:
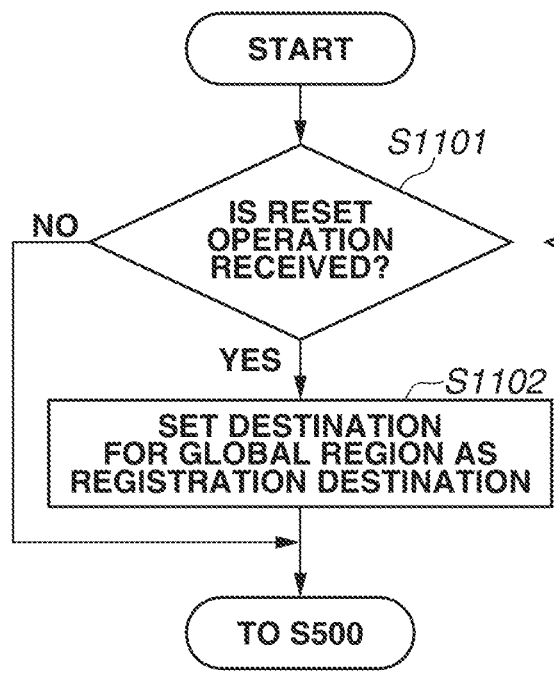
FIGS. 11A and 11B are flowcharts illustrating an example of control according to the fourth exemplary embodiment.

FIG. 11A illustrates an initialization process applied in a case where the control according to the first exemplary embodiment is performed and a case where the confirmation control according to the third exemplary embodiment is performed in addition to the control according to the first exemplary embodiment. If the processing in FIG. 11A is performed, the destination URL corresponding to the global region 102*a* is set as the registration destination.

Figure 11B:
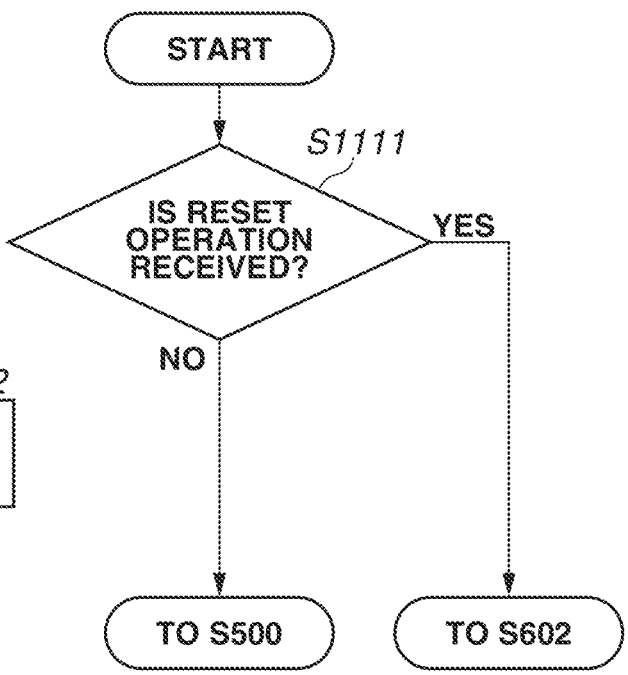

In contrast, FIG. 11B illustrates an initialization process applied in a case where the processing according to the second exemplary embodiment is performed or a case where the confirmation process according to the third exemplary embodiment is performed in addition to the processing according to the second exemplary embodiment. If the processing in FIG. 11B is performed, the destination URL corresponding to the destination information is set as the registration destination.

Control in FIG. 11A will now be described. In step S1101, the web UI control unit 303 determines whether information that occurs due to the selection of the display item 1002 on the client terminal and indicates that a reset operation is performed is received. If the information indicating that the reset operation is performed is not received (NO in step S1101), the processing proceeds to step S500. If the information indicating that the reset operation is performed is received (YES in step S1101), the processing proceeds to step S1102.

In step S1102, the web UI control unit 303 refers to the setting DB 305 and acquires the destination URL corresponding to the global region 102*a*. The web UI control unit 303 then overwrites the registration destination in the setting DB 305 with the acquired destination URL corresponding to the global region 102*a*. Finally, the web UI control unit 303 gives an instruction to update the screen provided to the client terminal. Based on the instruction, the client terminal updates the screen, and the series of processes ends.

A specific description will now be given of the initialization process applied in a case where the processing according to the second exemplary embodiment is performed or a case where the confirmation process according to the third exemplary embodiment is performed in addition to the processing according to the second exemplary embodiment, with reference to FIG. 11B. In step S1111, the control unit 303 cooperates with the client terminal to determine whether a reset operation is received. The specific content of the determination is similar to that illustrated in step S1101, and therefore is not described. If it is determined that the reset operation is received (YES in step S1111), the processing proceeds to step S602 described in the second exemplary embodiment. If it is determined that the reset operation is not received (NO in step S1111), the processing proceeds to step S500.

Based on the above processing, it is possible to easily appropriately reset the registration destination to the default value in a case where an input error occurs when the registration destination is input. A configuration can also be employed in which the registration destination is reset by the following method in addition to the initialization method described in FIG. 10. For example, a configuration may be employed in which other setting values are initialized, and a reset process equivalent to that illustrated in FIG. 11 is also performed, in a case where an operation for initializing the settings of the main body of the MFP 101 to the values before shipment from the factory is received.

In a fifth exemplary embodiment, a description is given of a mechanism for providing a user interface for selecting the registration destination more easily, in addition to the processing according to the first and second exemplary embodiments.

A screen 1201 illustrated in FIG. 12 is an example of a screen displayed instead of the screen 411 in FIG. 4. The screen 1201 is different from the screen 411 in that a label 1202 is displayed and a plurality of display items is displayed in an area 1203. In the label 1202, a message urging the user to select a region (an endpoint) is displayed. A text box corresponding to an item 1204 is used to change the URL of the transmission destination by directly inputting the URL. This function is similar to that of the first exemplary embodiment.

In the area 1203, a list of regions (endpoints) described in FIG. 7B in the second exemplary embodiment is displayed. Specifically, a plurality of display items indicating respective regions (endpoints), such as "USA", "Germany", "China", and "Global", is displayed in the area 1203.

The user can select one of the plurality of display items displayed in the area 1203. In the screen 1201, the screen after the display item corresponding to the CN region is selected is illustrated as an example.

A specific control method will be described with reference to a flowchart illustrated in FIG. 13. In step S1300, the web UI control unit 303 cooperates with the client terminal to display on the web browser the screen 1201 including display items for selecting a region for use in the CPS. The client terminal can receive through the screen 1201 a user operation for selecting a region.

In step S1301, the web UI control unit 303 determines whether information that occurs due to the reception of an operation for selecting a region on the screen 1201 displayed on the client terminal and identifies the selection operation for selecting a region is received. If the information identifying the selection operation for selecting a region is received (YES in step S1301), the processing proceeds to step S1302. If the information identifying the selection operation for selecting a region is not received (NO in step S1301), the processing proceeds to step S504.

In step S1302, the web UI control unit 303 changes the registration destination in the setting DB 305, based on the information identifying the selection operation for selecting a region. For example, if the display item "China" is selected and information indicating that the display item "China" is selected is received, the web UI control unit 303 overwrites the registration destination with the destination URL corresponding to the CN region 102d. The web UI control unit 303 further cooperates with the client terminal to update the display of the screen 1201. After the update is completed, the processing proceeds to step S504.

The display control process, as described above, makes it possible to provide a mechanism for switching a registration destination region more easily, when a printing control apparatus is registered in a cloud print service.

Figure 13:
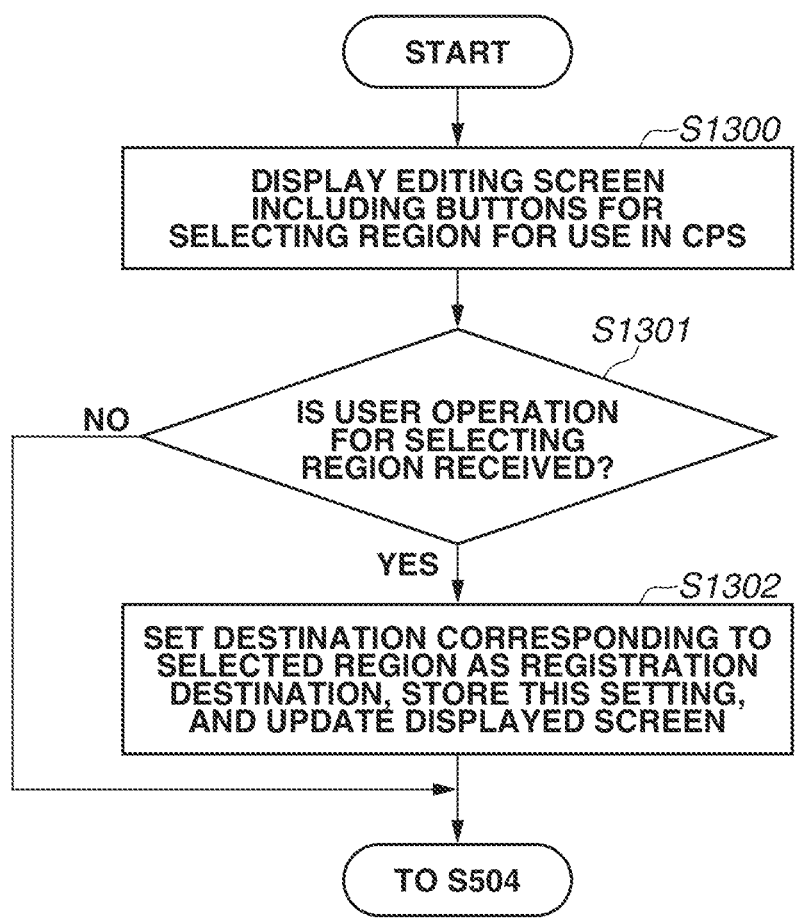
FIG. 13 is a flowchart illustrating an example of control according to the fifth exemplary embodiment.

In FIG. 13, a case has been illustrated as an example where the client terminal and the MFP 101 perform communication based on HTTP and update the screen according to the selection operation on the notification area 1203. The present invention, however, is not limited to this. For example, a configuration may be employed in which the correspondence relationship between information identifying a country and a URL corresponding to a region and a script such as JavaScript® for operating a web content are transmitted to the client in advance, and the screen is dynamically updated on the client side. In this case, the web browser on the client terminal submits information input to each item in a web form to the MFP 101, according to the selection of an OK button on the screen 1201. In this case, the MFP 101 may switch whether to update the registration destination based on the submitted information.

The fifth exemplary embodiment can also be combined with the operations of the control of the connection test described in the third exemplary embodiment or the reset control described in the fourth exemplary embodiment.

In a sixth exemplary embodiment, a description will be given of an operation in which, instead of the first exemplary embodiment, the position where the MFP 101 is installed is estimated, and the default value of the registration destination is set based on the estimated position information. The hardware configuration and the software configuration of the sixth exemplary embodiment are similar to those of the second exemplary embodiment, and therefore are not described.

Figure 14:
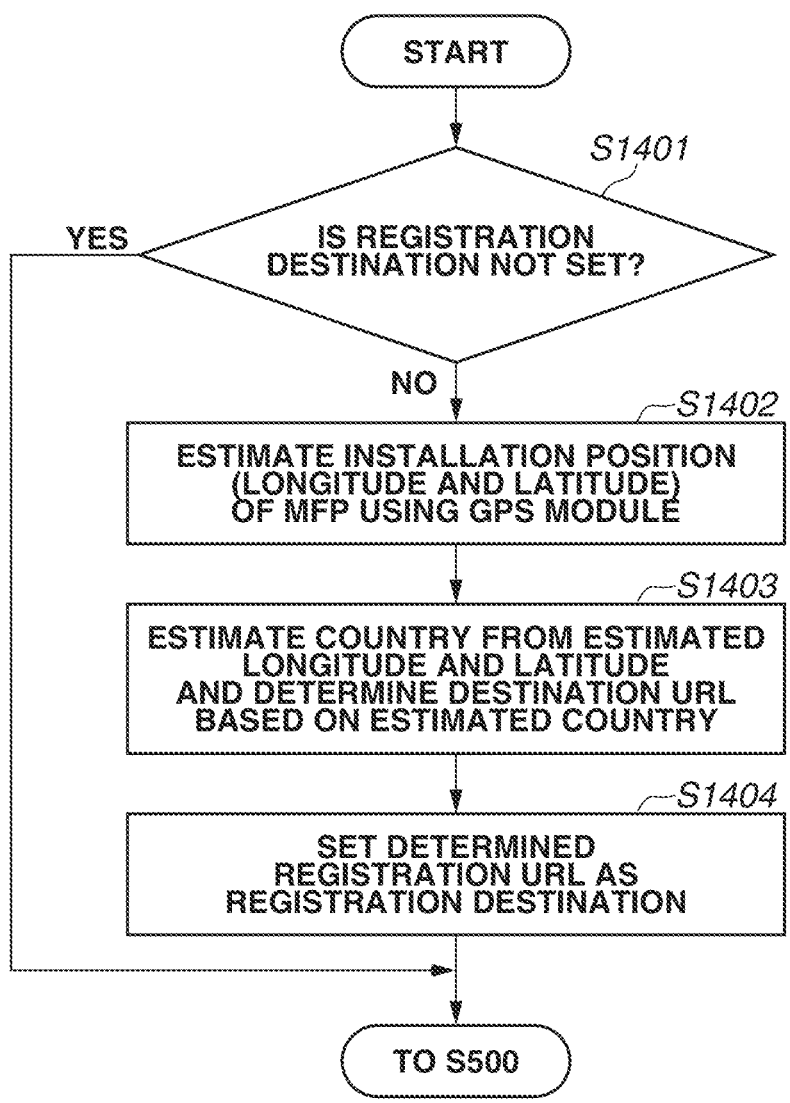
FIG. 14 is a flowchart illustrating an example of control according to a sixth exemplary embodiment.

Specific control will be described with reference to a flowchart illustrated in FIG. 14. The flowchart in FIG. 14 illustrates processing executed instead of the processing illustrated in the flowchart in FIG. 6 according to the second exemplary embodiment. In step S1401, the web UI control unit 303 determines whether the registration destination is not set. If it is determined that the registration destination is not set (NO in step S1401), the processing proceeds to step S1402. If it is determined that the registration destination is set (YES in step S1401), the processing proceeds to step S500.

In step S1402, the web UI control unit 303 cooperates with the GPS module 122 and the position information estimation unit 304 to estimate the installation position (the longitude and latitude) of the MFP 101 using the measurement result of the GPS module 122. After the estimation is completed, the processing proceeds to step S1403. In step S1404, the web UI control unit 303 estimates the country where the MFP 101 is installed, based on the longitude and latitude. The web UI control unit 303 then refers to the correspondence relationship illustrated in FIG. 7B based on information regarding the estimated country, and identifies a destination URL. For example, if the estimated country is DE, the destination URL corresponding to the DE region 102c is selected. If the estimated country is CN, the destination URL corresponding to the CN region 102d is selected. If the estimated country is US, the destination URL corresponding to the US region 102b is selected. If the estimated country is another country, the destination URL corresponding to the global region 102a is selected. Finally, the web UI control unit 303 overwrites the registration destination in the setting DB 305 with the identified destination URL, thereby updating the setting. After the update is completed, the control unit 303 generates web data corresponding to the setting screen based on the updated information and transmits the web data to the client terminal.

Based on the above processing, it is possible to appropriately vary a registration destination based on the installation position of an MFP. The timing when the registration destination is updated is not limited to this. A configuration may be employed in which a display item "update current location" is further placed on the setting screen described in FIG. 4. In this case, a configuration may be employed in which the update process illustrated in FIG. 14 is executed in response to the selection of the display item such as "update current location".

Further, in the present exemplary embodiment, a method using the GPS has been illustrated as an example of the method for estimating the installation position of the MFP 101. The present invention, however, is not limited to this. For example, a configuration can also be employed in which the installation position of the MFP 101 is estimated using a method for identifying the position of the client based on a global IP address such as GeoIP2.

It is possible that an auditing standard and a rule in each country or each area will continue to increase in the future. Thus, a mechanism for updating the correspondence relationship illustrated in FIG. 7B may be provided, in a case where the firmware of the MFP 101 is updated.

According to the above exemplary embodiments, it is possible to appropriately set a registration destination region in a case where a printing control apparatus is registered in a cloud print service.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-123282, filed Jul. 17, 2020, which is hereby incorporated by reference herein in its entirety.

What is claimed is:

1. A printing control apparatus comprising:
at least one memory that stores a set of instructions; and
at least one processor that executes the instructions, the instructions, when executed, causing the printing control apparatus to perform operations comprising:
setting, based on an input from a user, a transmission destination related to a predetermined cloud print service, the set transmission destination corresponding to one of a plurality of different regions where the predetermined cloud print service is provided; and
transmitting, to the set transmission destination, a registration request to register the printing control apparatus in the predetermined cloud print service.

2. A control method for controlling a printing control apparatus, the control method comprising:
setting, based on an input from a user, a transmission destination related to a predetermined cloud print service, the set transmission destination corresponding to one of a plurality of different regions where the predetermined cloud print service is provided; and
transmitting, to the set transmission destination, a registration request to register the printing control apparatus in the predetermined cloud print service.

3. The control method according to claim 2, further comprising determining a default value of the transmission destination based on information indicating a destination of the printing control apparatus.

4. The control method according to claim 3, further comprising controlling to display on a display unit a display item for resetting the set transmission destination to the default value,
wherein in a case where a user operation for selecting the display item is received, the set transmission destination is reset to the default value.

5. The control method according to claim 3, further comprising receiving an operation for resetting the printing control apparatus to a state before shipment from a factory,
wherein in a case where the operation for resetting the printing control apparatus is received, the default value is determined based on the information indicating the destination.

6. The control method according to claim 2, further comprising:
estimating a location where the printing control apparatus is installed; and
determining a default value of the transmission destination based on the estimated location.

7. The control method according to claim 6, wherein the location is estimated by using the Global Positioning System (GPS).

8. The control method according to claim 6, wherein the location is estimated by using an Internet Protocol (IP) address used for communication by the printing control apparatus.

9. The control method according to claim 2, further comprising receiving a Uniform Resource Locator (URL) indicating the transmission destination input through a setting screen,
wherein the URL received through the setting screen is set as the transmission destination related to the predetermined cloud print service.

10. The control method according to claim 9, further comprising:
transmitting the registration request to the received URL in a case where a user operation for changing the transmission destination is received; and
controlling to vary whether to set the received URL as the transmission destination related to the predetermined cloud print service, based on a reception state of a response to the registration request.

11. The control method according to claim 2,
wherein a user operation for identifying a region is received, and a URL corresponding to the region identified by the user operation is set as the transmission destination related to the predetermined cloud print service, and
wherein the URL corresponding to the region is identified based on information regarding a correspondence relationship between a region and a URL indicating the transmission destination of the registration request stored in a predetermined storage area.

12. The control method according to claim 2, further comprising acquiring a print job from the predetermined cloud print service, after the printing control apparatus is registered in the predetermined cloud print service in the region corresponding to the transmission destination, triggered by the registration request transmitted to the transmission destination.

13. The control method according to claim 2, wherein the printing control apparatus is a print server configured to receive a print job from outside the print server and transmit the received print job to a printing apparatus under control of the print server.

14. The control method according to claim 2, wherein the printing control apparatus is a printing apparatus including a printing unit configured to print an image on a sheet based on a print job.

15. A non-transitory computer readable storage medium storing a program for causing a computer to execute a method for controlling a printing control apparatus, the method comprising:
setting, based on an input from a user, a transmission destination related to a predetermined cloud print service, the set transmission destination corresponding to one of a plurality of different regions where the predetermined cloud print service is provided; and transmitting, to the set transmission destination, a registration request to register the printing control apparatus in the predetermined cloud print service.

16. A printer for connecting with a cloud print service that is provided in a plurality of regions, the printer comprising:
at least one memory that stores a set of instructions; and
at least one processor that executes the instructions, the instructions, when executed, causing the printer to perform operations comprising:
based on region information set in the printer, determining a transmission destination for a region which, among the plurality of regions, corresponds to the region information;
outputting a printer registration screen to be displayed for registration of the printer into the cloud print service, wherein a transmission destination on the printer registration screen has been set to the determined transmission destination and is changeable based on an operation via the printer registration screen; and
transmitting, to the transmission destination that has been changed via the printer registration screen, information of the printer.

17. The printer according to claim 16,
wherein the plurality of regions includes a first region and a second region, and
wherein a transmission destination for the first region is different from a transmission destination for the second region.

18. The printer according to claim 16,
wherein the region information set in the printer is destination information, and
wherein the destination information is information for identifying a consuming area or a shipment area.

19. The printer according to claim 16, wherein the outputting the printer registration screen is providing web data included in the printer registration screen to a client terminal.

20. The printer according to claim 16, wherein the operation via the printer registration screen is an operation for inputting a URL to an item included in the printer registration screen.

21. The printer according to claim 16,
wherein the information of the printer at least includes a device ID for identifying the printer, and
wherein at least the device ID is registered into the cloud print service.

22. The printer according to claim 16, wherein the registration of the printer into the cloud print service is completed in a case where, after the information of the printer has been transmitted to the transmission destination, information is additionally transmitted to the cloud print service.

23. A method for controlling a printer for connecting with a cloud print service that is provided in a plurality of regions, the method comprising:
based on region information set in the printer, determining a transmission destination for a region which, among the plurality of regions, corresponds to the region information;
outputting a printer registration screen to be displayed for registration of the printer into the cloud print service, wherein a transmission destination on the printer registration screen has been set to the determined transmission destination and is changeable based on an operation via the printer registration screen; and
transmitting, to the transmission destination that has been changed via the printer registration screen, information of the printer.

24. The method according to claim 23,
wherein the plurality of regions includes a first region and a second region, and
wherein a transmission destination for the first region is different from a transmission destination for the second region.

25. The method according to claim 23,
wherein the region information set in the printer is destination information, and
wherein the destination information is information for identifying a consuming area or a shipment area.

26. The method according to claim 23, wherein the outputting the printer registration screen is providing web data included in the printer registration screen to a client terminal.

27. The method according to claim 23, wherein the operation via the printer registration screen is an operation for inputting a URL to an item included in the printer registration screen.

28. The method according to claim 23,
wherein the information of the printer at least includes a device ID for identifying the printer, and
wherein at least the device ID is registered into the cloud print service.

29. The method according to claim 23, wherein the registration of the printer into the cloud print service is completed in a case where, after the information of the printer has been transmitted to the transmission destination, information is additionally transmitted to the cloud print service.

30. A non-transitory computer readable storage medium storing a program for causing a computer to execute a method for controlling a printer for connecting with a cloud print service that is provided in a plurality of regions, the method comprising:
based on region information set in the printer, determining a transmission destination for a region which, among the plurality of regions, corresponds to the region information;
outputting a printer registration screen to be displayed for registration of the printer into the cloud print service, wherein a transmission destination on the printer registration screen has been set to the determined transmission destination and is changeable based on an operation via the printer registration screen; and
transmitting, to the transmission destination that has been changed via the printer registration screen, information of the printer.

31. The non-transitory computer readable storage medium according to claim 30,
wherein the plurality of regions includes a first region and a second region, and
wherein a transmission destination for the first region is different from a transmission destination for the second region.

32. The non-transitory computer readable storage medium according to claim 30,
wherein the region information set in the printer is destination information, and
wherein the destination information is information for identifying a consuming area or a shipment area.

33. The non-transitory computer readable storage medium according to claim 30, wherein the outputting the printer registration screen is providing web data included in the printer registration screen to a client terminal.

34. The non-transitory computer readable storage medium according to claim 30, wherein the operation via the printer registration screen is an operation for inputting a URL to an item included in the printer registration screen.

35. The non-transitory computer readable storage medium according to claim 30,
  wherein the information of the printer at least includes a device ID for identifying the printer, and
  wherein at least the device ID is registered into the cloud print service.

36. The non-transitory computer readable storage medium according to claim 30, wherein the registration of the printer into the cloud print service is completed in a case where, after the information of the printer has been transmitted to the transmission destination, information is additionally transmitted to the cloud print service.

* * * * *